A. V. JENNINGS.
FRUIT PITTING MACHINE.
APPLICATION FILED JULY 29, 1919.
1,361,765.
Patented Dec. 7, 1920.
2 SHEETS—SHEET 2.
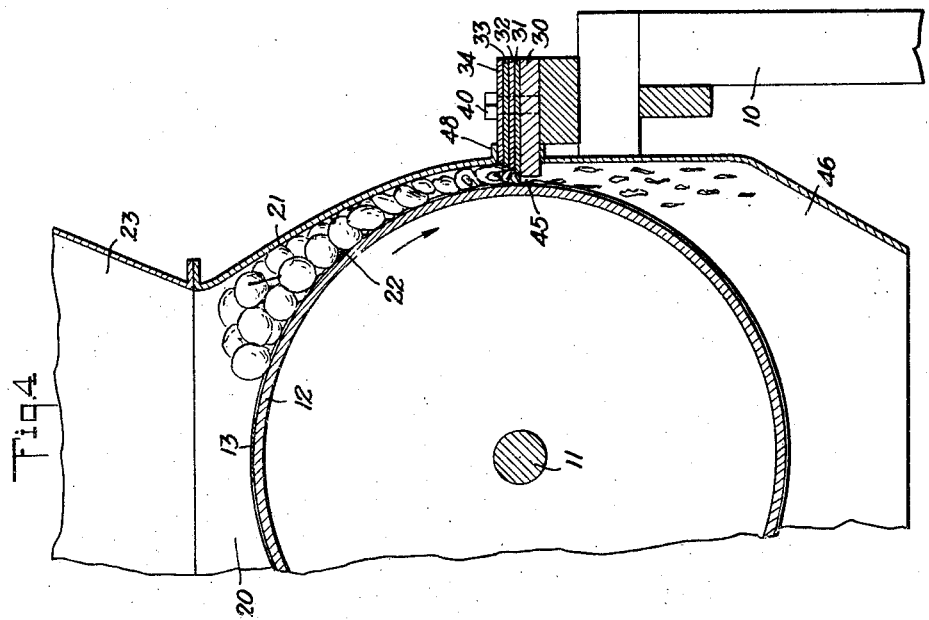
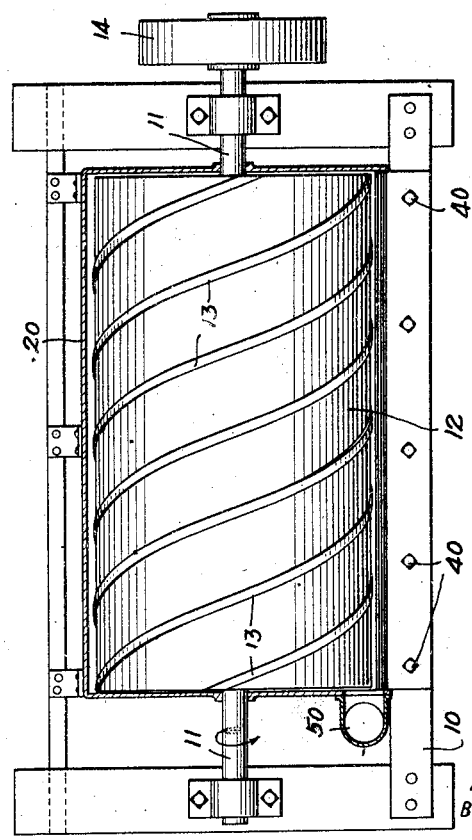
WITNESSES
Frederick Diehl.
INVENTOR
Arthur V. Jennings
BY
ATTORNEYS

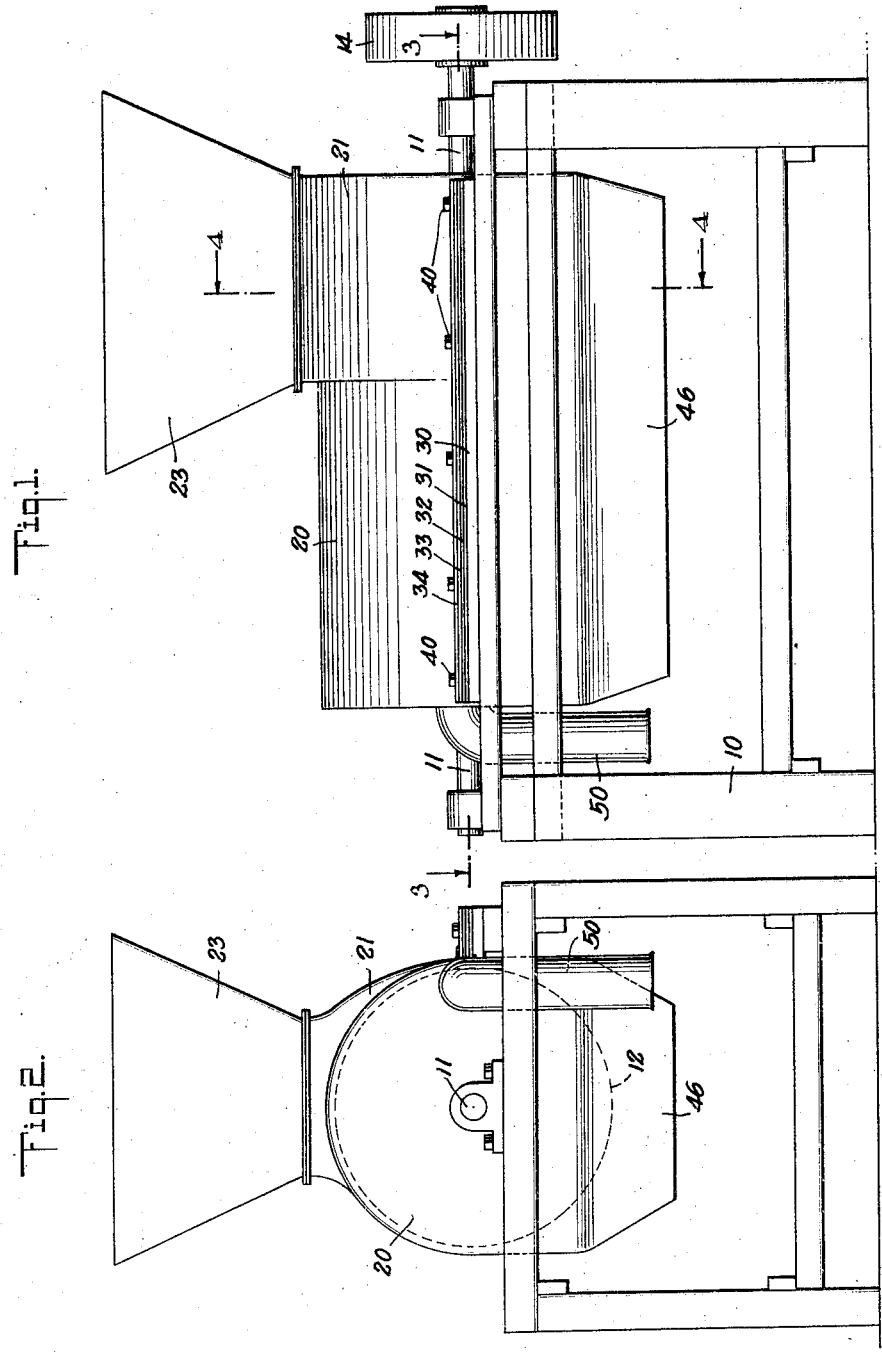

UNITED STATES PATENT OFFICE.

ARTHUR V. JENNINGS, OF NEW YORK, N. Y., ASSIGNOR TO VICTOR J. KUBANYI, OF NEW YORK, N. Y.

FRUIT-PITTING MACHINE.

1,361,765.

Specification of Letters Patent.     Patented Dec. 7, 1920.

Application filed July 29, 1919. Serial No. 314,015.

*To all whom it may concern:*

Be it known that I, ARTHUR V. JENNINGS, a citizen of the United States, and a resident of the city of New York, borough of Manhattan, in the county and State of New York, have invented a new and Improved Fruit-Pitting Machine, of which the following is a full, clear, and exact description.

The object of the invention is to provide a new and improved fruit pitting machine for quickly and effectively separating the meat from the pits or stones of cherries, peaches, olives and other hard stone fruits. Another object is to accommodate different sizes of fruit undergoing pitting at the time without requiring resetting of the machine for different sizes. Another object is to separately discharge the meat and the stones or pits from the machine. Another object is to provide a pitting machine of simple construction and capable of handling a large amount of fruit in a comparatively short time.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the pitting machine;

Fig. 2 is an elevation of the discharge end of the same;

Fig. 3 is a sectional plan view of the same on the line 3—3 of Fig. 1; and

Fig. 4 is an enlarged cross section of the same on the line 4—4 of Fig. 1.

On a suitably constructed frame 10 is journaled a drum shaft 11 supporting a drum 12 provided on its peripheral face with spiral conveying means 13, preferably in the form of ribs, as plainly indicated in Figs. 3 and 4. One end of the drum shaft 11 is provided with a pulley 14 connected by belt (not shown) with other machinery for imparting a rotary motion to the drum 12. The drum 12 is arranged in a housing 20 supported on the frame 10 and provided at one side adjacent one end of the drum 12 with a crushing plate 21 spaced from the peripheral face of the drum 12 to provide a crushing chamber 22 which gradually diminishes in depth from the top downward to crush the meat of the fruit as the latter passes down in the chamber 22. The housing 20 is provided at the top with a hopper 23 arranged for delivering the fruit to the chamber 22.

The bottom of the chamber 22 is formed by a separator and retainer made of a series of plates 30, 31, 32, 33 and 34, spaced one on top of the other and fastened in place on the frame 10 by bolts 40 or other fastening means extending through the several plates. The superimposed plates 30, 31, 32, 33 and 34 extend throughout the length of the drum 12, and the inner ends of the said plates are arranged step-like, with the inner edge of the lowermost plate 30 nearest the peripheral face of the drum 12 to form a passage 45 for the meat of the fruit to drop down into a chute 46 arranged around the lower portion of the drum 12. A suitable receptacle is placed below the chute 46, in which the meat can accumulate. The inner edge of the uppermost plate 34 is adjacent the inner surface of the lower end of the plate 21, which latter has its lower edge provided with an outwardly extending flange 48 seated on the top of the uppermost plate 34. It is understood that the outlet 45 for the meat is sufficiently narrow to prevent a pit or stone from dropping down and hence the pits or stones are retained by the plates 30 to 34 in the lower end of the chamber 22. When the drum 12 rotates, the spiral conveying means 13 move the stones or pits lengthwise along the step-like inner edges of the plates 30 to 34 thus completely separating the pits or stones from the meat and finally discharging the stones from the end of the drum 12 into a discharge tube 50 through which the pits or stones drop into a suitable receptacle held below the lower end of the said tube.

The operation is as follows:

The drum 12 is rotated in the direction of the arrow shown in Fig. 4, and the fruits are placed into the hopper 23 from which they pass into the chamber 22, the lower end of which is less in depth than the diameter of the fruit. As the fruit gravitates downward aided by the rotation of the drum 12 it is pressed against the crushing member 21 thus crushing the meat. When the crushed meat and the pits therein reach the plates 30 to 34, the pits are retained by the plates while the crushed meat is stripped off the pits and passes down through the narrow passage 45 into the chute 46 and from the latter into a suitable receiving receptacle. The pits are engaged by the conveying ribs 13 and are then carried along the inner edges of the plates 30 to 34 whereby the pits are completely separated from the meat and are finally discharged through the tube 50 into a suitable receiving receptacle held below the said tube. From the foregoing it will be seen that by the arrangement described the meat of the fruit is crushed, separated from the pits and separately discharged from the pits. A large amount of fruit can be pitted in a comparatively short time by the use of this machine.

Having thus described my invention, I claim as new and desire to secure by Letters Patent:—

1. A fruit pitting machine, comprising a revoluble drum, a fixed member arranged on one side of the drum adjacent one end thereof and forming with a portion of the peripheral face of the said drum a crushing chamber gradually decreasing in depth from the top downward, and a step separator arranged lengthwise at one side of the drum, part of the separator forming a bottom for the said passage, the separator having its steps leading upward away from the peripheral face of the drum, the lowermost step being spaced from the peripheral face of the drum to form a narrow passage for the crushed meat of the fruit to drop through while the pits are retained by the said separator, and conveying means for moving the pits along the said separator to discharge the same at the other end of the drum.

2. A fruit pitting machine, comprising a revoluble drum, a fixed crushing plate on one side of the drum and forming with the latter a crushing chamber in which the meat of the fruit is crushed, and a separating and retaining member of step form arranged at the lower end of the said crushing plate and spaced from the peripheral face of the drum, the bottom step forming with the peripheral face of the drum a discharge passage for the meat, and spiral means on the peripheral face of the drum for moving the stones along the said step member to discharge the stones at one end of the drum.

3. A fruit pitting machine, comprising a revoluble drum provided on its peripheral face with spiral conveyers, a fixed crushing plate arranged on one side of the said drum adjacent one end thereof, the crushing plate forming with the peripheral face of the drum a crushing chamber in which the meat of the fruit is crushed, the said crushing chamber decreasing in depth from the top downward, and a separator and retainer at the bottom of the said crushing chamber and formed of a series of superposed plates having their inner edges arranged in step form, the lowermost plate having its inner edge nearest the peripheral face of the drum to provide a passage for the meat, the passage being so narrow as to prevent the pits from dropping therethrough, the said spiral conveying means coacting with the said plates to convey the pits to the other end of the drum to discharge the pits separate from the meat.

ARTHUR V. JENNINGS.